United States Patent [19]

Feaster, Jr.

[11] Patent Number: 5,016,541
[45] Date of Patent: May 21, 1991

[54] GREENHOUSE TRANSPORT SYSTEM

[76] Inventor: William L. Feaster, Jr., 84 Spoonbill La., Ellenton, Fla. 34222-4213

[21] Appl. No.: 450,458

[22] Filed: Dec. 14, 1989

[51] Int. Cl.⁵ .................... B65G 1/00; B66B 17/18
[52] U.S. Cl. ................................ 104/129; 104/94; 104/96; 104/131
[58] Field of Search ............... 104/132, 130, 122, 89, 104/94, 48, 127, 128, 129, 131, 96; 414/279

[56] References Cited

U.S. PATENT DOCUMENTS

| | | | |
|---|---|---|---|
| 2,256,862 | 9/1941 | Duffy | 104/129 |
| 2,667,983 | 2/1954 | Billings | 104/127 |
| 3,611,946 | 10/1971 | Heximer | 104/127 |
| 4,109,584 | 8/1978 | Mihirogi | 104/130 |
| 4,395,180 | 7/1983 | Magnotte | 104/127 |
| 4,411,357 | 10/1983 | Caddell | 104/127 |
| 4,876,965 | 10/1989 | Koslowski et al. | 104/129 |
| 4,938,149 | 7/1990 | Lotzer | 104/130 |

FOREIGN PATENT DOCUMENTS 0126716  11/1984  European Pat. Off. ............ 104/127

Primary Examiner—Robert J. Oberleitner
Assistant Examiner—Mark T. Le
Attorney, Agent, or Firm—A. W. Fisher, III

[57] ABSTRACT

A greenhouse transport system for moving plants and plant trays through a greenhouse comprising a cart including a carriage assembly having at least one roller extending upwardly from the cart, an overhead track assembly including at least one track channel to selectively receive the roller to support the cart thereon, and at least one lift station including a lift member movable between a lower and upper position having a lift channel formed thereon to receive the roller therein and an alignment assembly such that when the lift member is in the lower position the roller is operatively disposed in the lift channel and the lift channel is axially aligned relative to the track channel by the alignment assembly as the lift member is moved from the lower position to the upper position to permit the cart to be moved from the lift channel to the track channel whereby the roller is disposed within the track channel for movement through the greenhouse on the overhead track assembly.

6 Claims, 5 Drawing Sheets

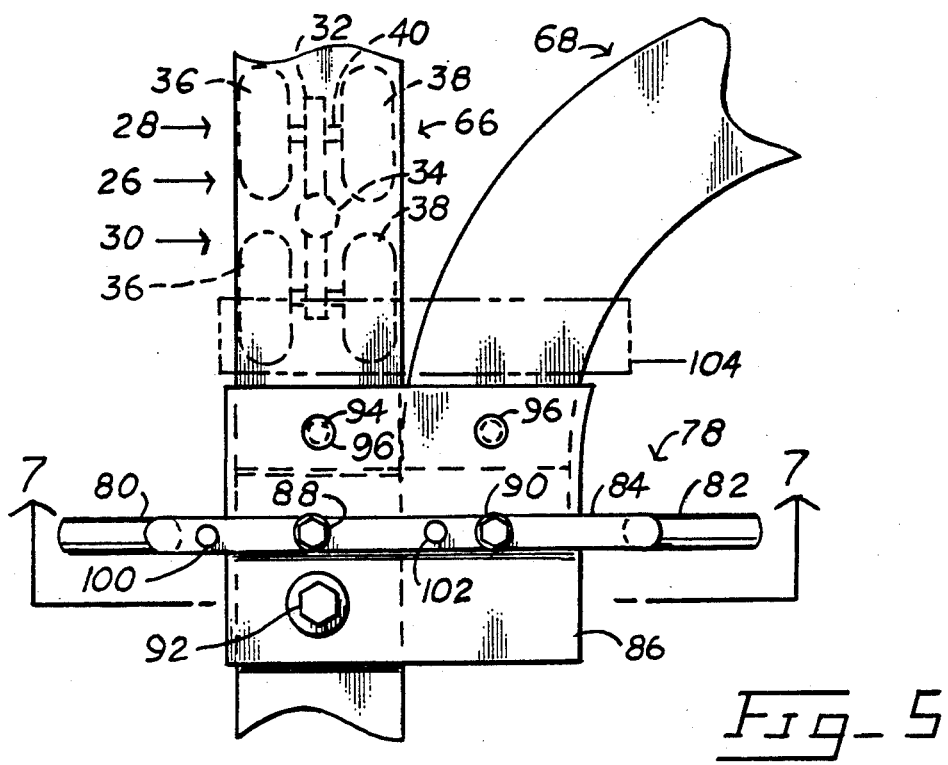
Fig_5
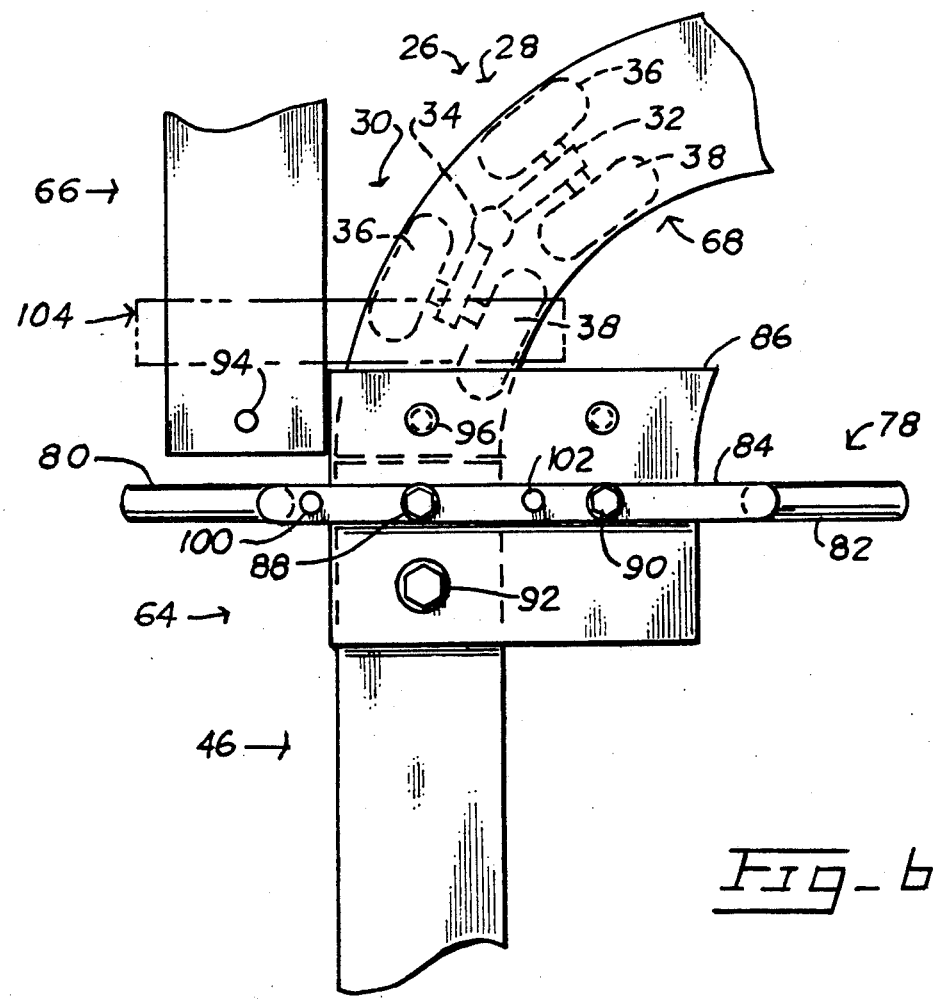
Fig_6

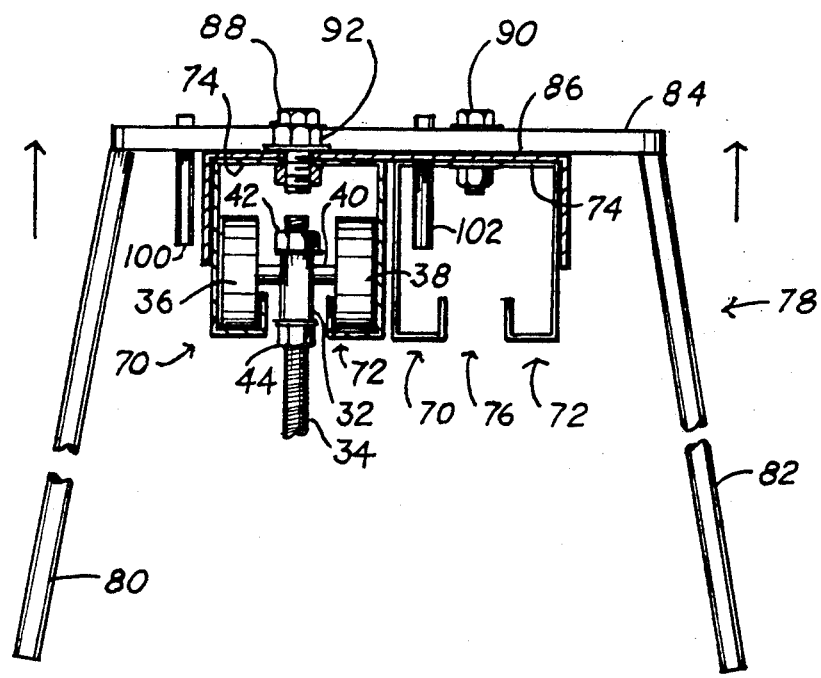
Fig_7
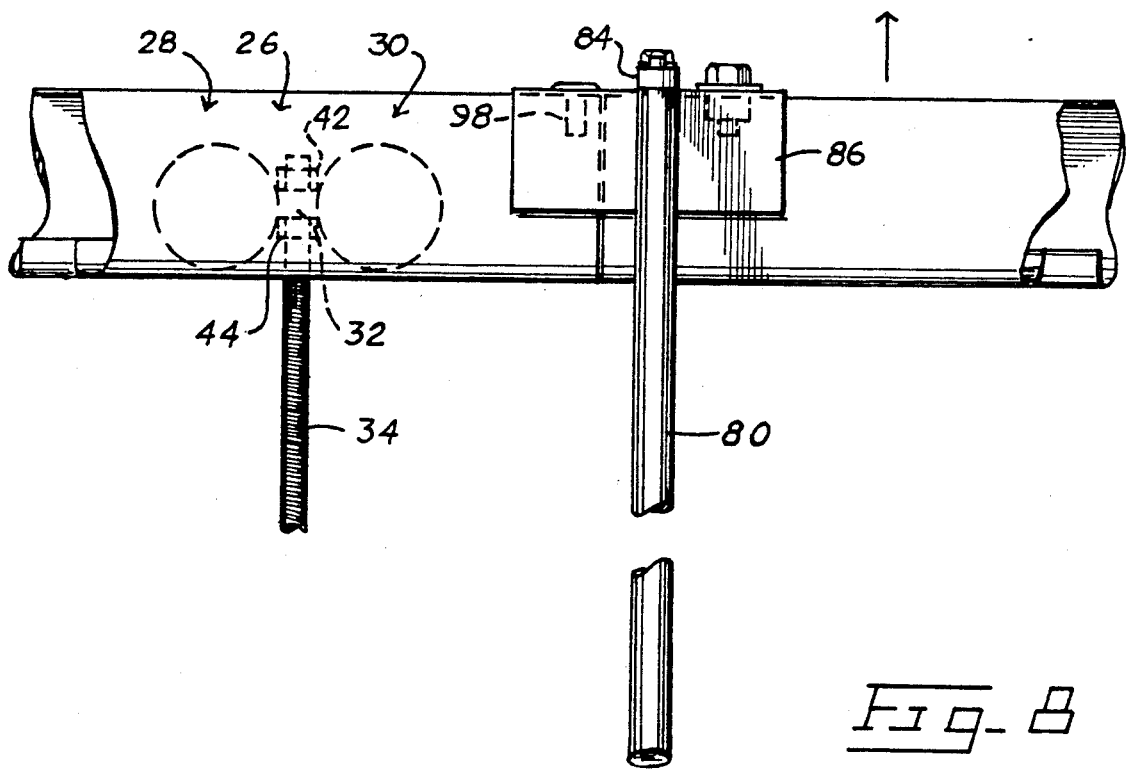
Fig_8

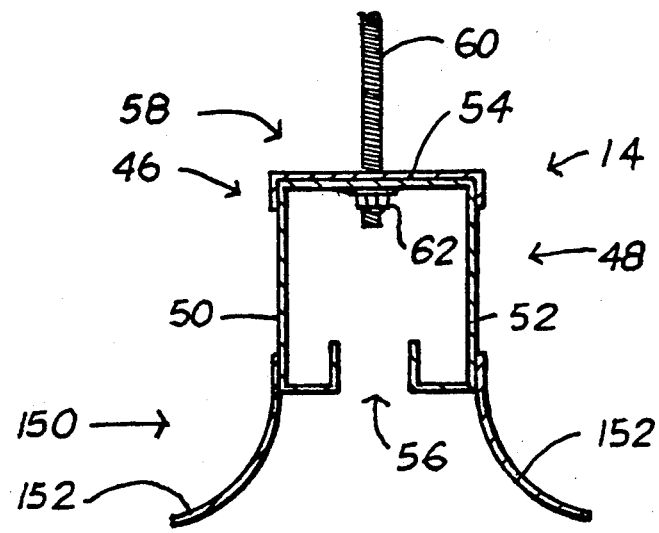
Fig_9
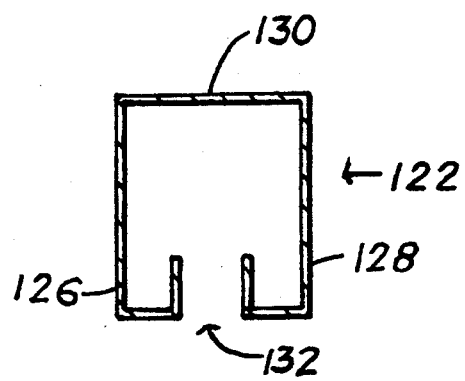
Fig_10

GREENHOUSE TRANSPORT SYSTEM

BACKGROUND OF THE INVENTION

1. Field of the Invention

A greenhouse transport system for moving plants and plant trays through a greenhouse.

2. Description of the Prior Art

Transplanting of potted plants and trees in greenhouses typically include moving plants or trees and containers onto pallets loaded onto carts transported on racks where the pallets are moved from the carts onto the rack.

U.S. Pat. No. 3,913,758 shows an apparatus for handling plants within a greenhouse where the plants and containers are loaded upon pallets which in turn are placed on wheeled carts and moved to supporting racks within the greenhouse. The pallets are then transferred from the carts to the racks. The carts and racks include parallel roller tracks spaced at a predetermined distance.

U.S. Pat. No. 4,547,992 disclosed an apparatus for carrying plants to a watering station ensuring that the plants are uniformly exposed to light including at least one conveyor in the form of an endless cable disposed about a pair of spaced drums. One of the spaced drums is driven by a motor to cause the cable to be circulated around the drums. The cable supports a plurality of plant hangers at spaced locations.

U.S. Pat. No. 4,043,463 shows material storage frames or rack assemblies. Each rack assembly includes vertical columns and horizontal rows of bins for the storage of material. A pair of Z-rails confront each other from opposite sides of an aisle having oppositely extending bottom flanges secured rigidly to the floor and upper flanges extending inwardly of the aisle which form guide tracks.

U.S. Pat. No. 4,759,676 teaches a transporting arrangement, specifically suited for use in a storage rack, employing gravity-urged wheel-supported buggies for storing and transporting goods. The wheel-supported buggies are supported on elongated rails having flat support surfaces for engagement with buggy wheels.

U.S. Pat. No. 4,693,661 shows a connecting elevator for serving, handling or working units which operate on mine benches of different level comprising a supporting structure carrying a hoisting equipment supported, at least at its upper end for travelling on a bench with the hoisting equipment including hoisting vessels running on rails and suspended from ropes.

U.S. Pat. No. 4,124,129 discloses a loader-unloader and storage system for loads such as cargo containers or trailers. The device includes a lift frame with forks or hooks to engage a load. A frame is pivotally secured on a plurality of parallel crank arms each mounted to rotate on a vertical pivot to form a parallelogram linkage. The parallel crank arms are supported on wheels that run on a circular track concentric under each parallel crank arm. The track has slopes to lift and lower the parallel crank arms together according to the rotary position of the parallel crank arms and track to transfer loads to or from a vehicle having side latches coupled to the forks, the frame or the load.

U.S. Pat. No. 3,997,059 teaches a garment device including a drive and support assembly located between joints above a closet ceiling. The assembly includes a switch controlled electric motor, a gear reduction box and a drive shaft rotatably carried in a sleeve member attached to the assembly U.S. Pat. No. 4,252,297 teaches a moveable cart for transporting structures configured for mounting upon a wall rail. The cart includes a roller linkage assembly pivotally mounted to a wheeled frame and a deck mounted on a linkage assembly. The deck is engaged by the rollers of the linkage assembly so that the vertical position of the deck can be moved with regard to the wall rail, allowing a modular cell structure placed on the deck to be carried upward of downward.

SUMMARY OF THE INVENTION

The present invention relates to a greenhouse transport system for moving plants and plant trays through a greenhouse. More specifically, the greenhouse transport system comprises a cart configured to be selectively supported by an overhead track assembly for movement through the greenhouse and at least one lift station to lift the cart from the ground to the overhead track assembly.

The cart comprises a support surface to support a plurality of plants or plant trays having a plurality of support wheels extending downwardly therefrom to support the cart on the ground and a carriage assembly having at least one roller extending upwardly therefrom to selectively engage the overhead track assembly and lift station as described more fully hereinafter.

The overhead track assembly comprises at least one track channel to selectively receive the roller to support the cart thereon and permit movement of the cart along the overhead track assembly.

The lift station comprises a lift member moveable between a lower and upper position having a lift channel formed thereon to selectively receive the roller therein and an alignment means including a first and second alignment assembly to vertically and horizontally align the lift member relative to the overhead track assembly when the lift member is in the upper position.

In use, the cart is coupled to the lift member in the lower position with the roller disposed within the lift channel. The lift member is then moved from the lower position to the upper position. The alignment means aligns the lift channel vertically and horizontally relative to the track channel to permit movement of the roller of the cart from the lift channel to the track channel. The cart may then be moved along the overhead track assembly. To remove the cart from the overhead track assembly the operation of the lift station is reversed.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 5 is a top view of the switch station.

FIG. 6 is another top view of the switch station.

FIG. 7 is a cross-section view of the switch station taken along line 7—7 of FIG. 5.

FIG. 8 is a partial side view of the switch station.

FIG. 9 is a detailed end view of the overhead track channel means.

FIG. 10 is a detailed end view of the lift channel member.

Similar reference characters refer to similar parts throughout the several views of the drawings.

DETAILED DESCRIPTION OF THE PREFERRED EMBODIMENT

Figure 1:
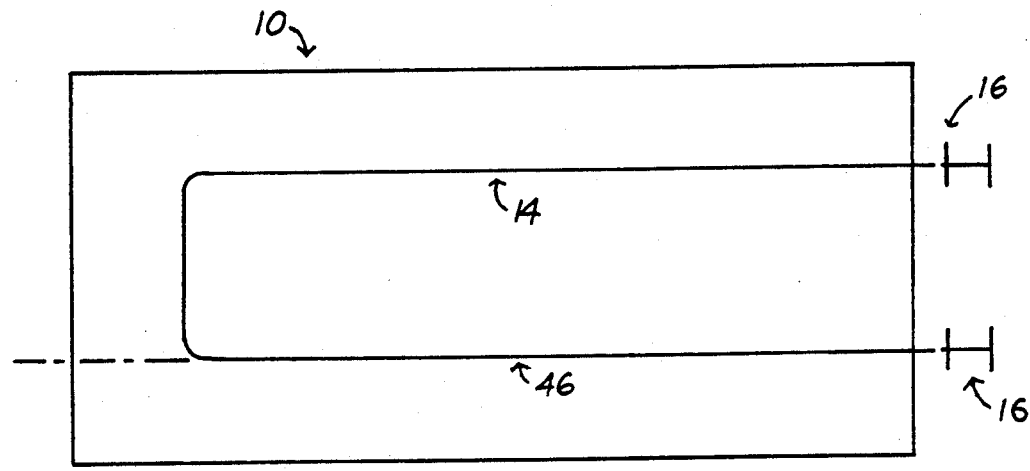
FIG. 1 is a schematic top view of the greenhouse transport system within a greenhouse.
Figure 2:
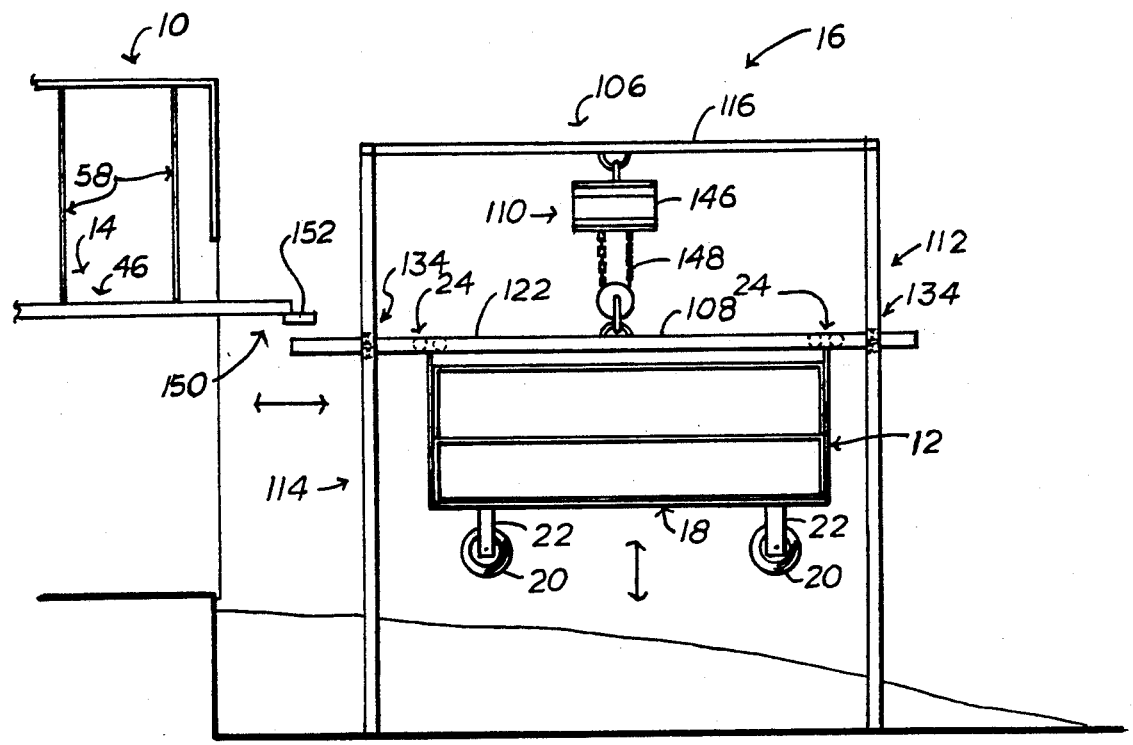
FIG. 2 is a side view of the lift station.
Figure 3:
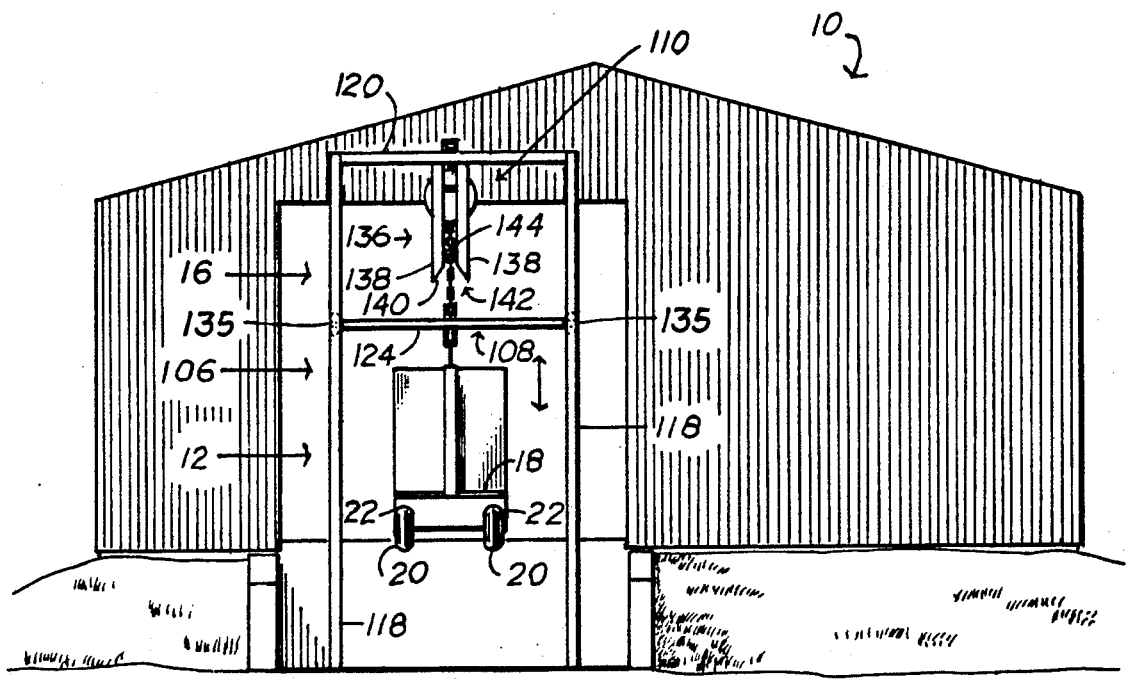
FIG. 3 is an end view of the lift station.

As shown is FIGS. 1 through 3, the present invention relates a greenhouse transport system for moving plants and the like through a greenhouse generally indicated as 10. More specifically, the greenhouse transport system comprises a cart generally indicated as 12 configured to be selectively supported by an overhead track assembly generally indicated as 14 in FIG. 1 for movement about the greenhouse 10 and at least one lift station generally indicated as 16 to selectively move the cart 12 between the ground and the overhead track assembly 14.

Figure 4:
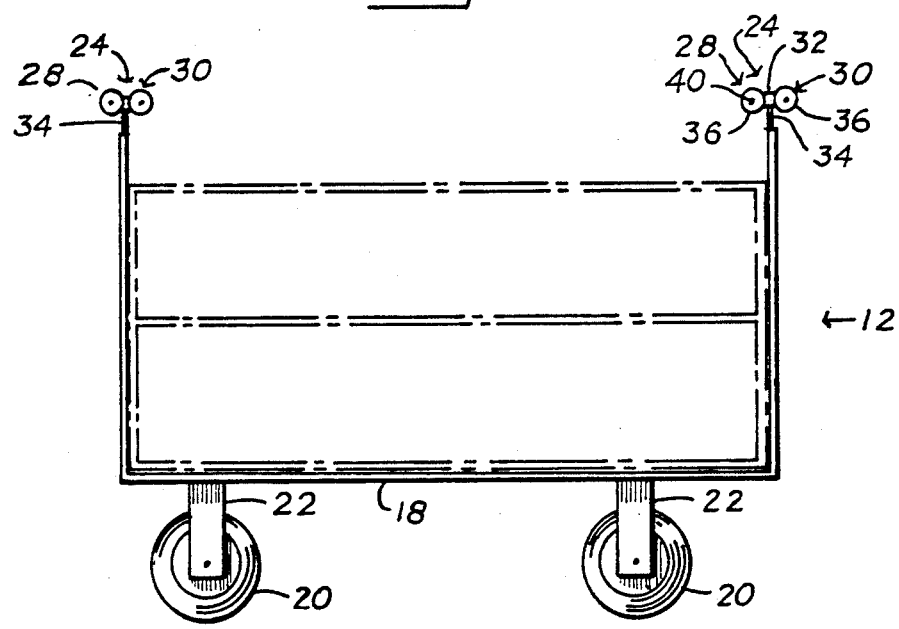
FIG. 4 is a side view of the cart.

As best shown in FIGS. 2 and 4, the cart 12 comprises a support surface or shelf 18 to support a plurality of plants on plant trays (not shown) having a plurality of support wheels each indicated as 20 held in fixed spaced relationship relative to the support surface or shelf 18 by a corresponding plurality of connecting members each indicated as 22 to support the cart 12 on the ground and a carriage assembly including a pair of carriage assembly sections each generally indicated as 24 to selectively engage the overhead track assembly 14 and lift station 16 as described more fully hereinafter. The supports wheels 20 may be bulbous in configuration as shown or any other conventional shape. As best shown in FIGS. 4 through 8, each carriage assembly section 24 comprises a roller assembly generally indicated as 26 including a first and second roller means generally indicated as 28 and 30 respectively interconnected by a bar 32 coupled to the cart 12 by a plurality of corresponding connecting members each indicated as 34. Both the first and second roller means 28 and 30 comprises a first and second roller indicated as 36 and 38 rotatably coupled to the bar 32 by a shaft 40 disposed in spaced relationship relative an upper and lower fastener element indicated as 42 and 44 secured to the upper portion of the corresponding connecting member 34.

As best shown in FIG. 9, the overhead track assembly 14 comprises an overhead track channel means generally indicated as 46. The overhead track channel means 46 comprises an overhead track channel member 48 including a first and second track channel indicated as 50 and 52 respectively to selectively receive and support the first and second rollers 36 and 38 of the first and second roller means 28 and 30 to movably support the cart 12 on the overhead track assembly 14. The first and second track channels 50 and 52 are held in spaced relationship relative to each other by an interconnecting track channel element 54 forming a track channel slot 56 therebetween to receive the connecting members 34. The track channel means 46 may be suspended from the roof of the greenhouse 10 by a plurality of suspension members each generally indicated as 58. Each suspension member 58 may comprise a threaded rod 60 attached to the interconnecting channel element 54 by a fastening member 62.

As best shown in FIGS. 5 through 8, the overhead track assembly 14 further includes a switching station generally indicated as 64 to selectively direct the cart 12 to either a first overhead track member extension 66 or a second overhead track member extension 68.

As best shown in FIG. 7, the first and second overhead member extensions 66 and 68 each comprises a first and second track channel extension 70 and 72 respectively to selectively receive and support the first and second rollers 36 and 38 of the first and second roller means 28 and 30 to movably support the cart 12 thereon. The first and second track channel extensions 70 and 72 are held in spaced relationship relative to each other by an interconnecting track channel element extension 74 forming a track channel slot extension 76 to receive the connecting members 34. The switching station 64 comprises a positioning means generally indicated as 78 affixed to the end of the track channel member 48 to selectively align the track channel member 48 with the first track member extension 66 or second track member extension 68 as shown in FIGS. 5 and 6 respectively. The positioning means 78 comprises a first and second positioning member indicated as 80 and 82 respectively held in spaced relationship relative to each other by an interconnecting positioning member 84. The interconnecting positioning member 84 is secured to a positioning channel member 86 by a first and second attachment member indicated as 88 and 90 respectively; while, the interconnecting positioning member 82 and positioning channel member 86 are secured to the end of the track channel member 48 by the first attachment member 88 and a fastener 92.

The switching station 60 further includes a channel alignment means and a cart stop means. As shown in FIGS. 5, 6 and 8, the channel alignment means comprises a first and second channel alignment aperture indicated as 94 and 96 respectively formed through of the first and second track member extension 66 and 68 respectively to selectively receive an alignment pin 98 extending downwardly from the positioning channel member 86. As shown in FIGS. 5 through 9, the cart stop means comprises a first and second stop member indicated as 100 and 102 respectively to selectively block the first and second overhead track member extensions 66 and 68 respectively. Specifically, as shown in FIGS. 5 and 7, when the alignment pin 98 is aligned with the first channel alignment aperture 94 the overhead track channel member 48 is operatively aligned with the first overhead track member extension 66 to permit movement of carts 12 thereto. So configured, the second stop member 102 prevents movement of carts 12 from or to the second overhead track member extension 68. Similarly, the switching station 64 may be aligned with the second overhead track member extension 68 as shown in FIG. 6 by movement of the positioning means 78 to place the alignment pin 98 in the second channel alignment aperture 96. So configured, the first stop member 100 prevents movement of carts 12 from or to the first overhead track member extension 66. Of course, a second alignment pin 98 may be provided to register with the first and second channel alignment aperture 94 and 96 when overhead track channel member 48 is aligned with the first track channel extension 70. A securing plate 104 may be affixed to the first and second overhead track member extension 66 and 68 to maintain proper alignment therebetween. Although two extensions are shown, any number of extensions may be used.

As best shown in FIGS. 2 and 3, the lift station 16 comprises a lift frame, lift mechanism and lift means generally indicated as 106, 108 and 110 respectively. The lift frame 106 comprises a front and rear substantially vertical lift frame section generally indicated as 112 and 114 held in fixed parallel spaced relation relative to each other by a plurality of substantially horizontal interconnecting lift frame members each indicated as 116. The front and rear substantially vertical lift frame sections 112 and 114 each comprises a pair of substantially vertical lift frame members each indicated as 118 held in fixed parallel spaced relation relative to each other by a substantially horizontal cross-lift frame member 120. The substantially vertical lift frame members 118 are formed in a u-shaped channel configuration to receive a portion of the lift mechanism 108 as described more fully hereinafter.

As best shown in FIGS. 2, 3 and 10, the lift mechanism 108 comprises a longitudinally disposed lift channel member generally indicated as 122 having a laterally disposed cross-lift mechanism member 124 affixed to each ends thereof and substantially perpendicular thereto. The lift channel member 122 includes a first and second lift channel indicated as 126 and 128 respectively to selectively receive and support the first and second rollers 36 and 38 of the first and second roller means 28 and 30 to movably support the cart 12 thereon. The first and second lift channel 126 and 128 are held in spaced relationship relative to each other by an interconnecting lift channel element 130 forming a lift channel slot 132 therebetween to receive the connecting member 34. A lift mechanism roller assembly generally indicated as 134 each including rollers 135, mounted on opposite ends of each cross-lift mechanism member 124, is disposed within the corresponding substantially vertical u-shaped lift frame member 118 to maintain vertical alignment of the lift channel member 122 relative to a pair of alignment members each generally indicated as 136 extending downwardly from the corresponding substantially horizontal cross-lift frame member 120. Each alignment member 136 comprises a pair of substantially vertical, parallel alignment elements each indicated as 138 spaced apart to operatively receive the lift channel member 122 therebetween. An alignment or cam surface 140 is formed on the lower portion of each corresponding pair of substantially vertical, parallel alignment element 138 to direct the lift channel member 122 to the corresponding alignment slot 142 formed therebetween. A stop means comprising a stop member 144 extending between each corresponding pair of substantially vertical, parallel alignment element 138 to limit the vertical movement of the lift channel member 122 within the alignment slots 142.

As best shown in FIG. 2, the lift means 110 may comprise any suitable motor 146 operatively coupled between the lift frame 106 and lift mechanism 108 by an interconnecting lift element 148 to selectively move the lift channel member 122 and cart 12 between a lower position and upper portion to align the cart 12 relative to the overhead track channel member 48.

As shown in FIG. 9, to further ensure longitudinal alignment of the lift channel member 122 in end-to-end relationship relative with the overhead track channel member 48, a guide means generally indicated as 150 is formed on the outer end portion of the overhead track channel member 48. The guide means 150 comprises a pair of inclined side flanges each indicated as 152 extending downwardly from opposite sides of the overhead track channel member 48.

In operation, a cart 12 is placed on the lift channel member 122 as previously described, while in the lower position, the motor 146 is then energized lifting the lift channel member 122 to the upper position. The lift channel member 122 is properly aligned in end-to-end relationship relative to overhead track channel member 48 by the lift mechanism roller assemblies 134, alignment members 136, stop members 144 and guide means 150. So positioned, the cart 12 is moved onto the overhead track channel member 48. The overhead track channel member 48, aligned by the switching station 64 with either the first or second overhead track member extension 66 and 68 as previously described, is moved around the overhead track assembly 14.

It is envisioned that a plurality of carts 12 are moved around the overhead track assembly 14 simultaneously. To remove the cart(s) 12 from the overhead track assembly 14, the lift station 16 procedure is simply reversed.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A greenhouse transport system for moving plants and plant trays through a greenhouse comprising a cart including a carriage assembly having at least one carriage assembly section including a roller extending upwardly from said cart, an overhead track assembly including a first track channel to receive said roller to support said cart thereon, and at least one lift station including a lift member movable between lower and upper positions having a lift channel formed thereon to receive said roller therein and an alignment assembly disposed to engage said lift member when in said upper position such that when said lift member is in said lower position said roller is operatively disposed in said lift channel and said lift channel is axially aligned relative to said first track channel by said alignment assembly as said lift member is moved from said lower position to said upper position to permit said cart to be moved from said lift channel to said first track channel whereby said roller is disposed within said first track channel for movement through the greenhouse on said overhead track assembly, said overhead track assembly further includes a switching station to selectively direct said cart from said first track channel to either a first overhead track member extension or a second overhead track member extension, said first overhead track member extension and said second overhead track member extension each comprises a first track channel extension to selectively receive said roller and a positioning means affixed to said first track channel to move said first track channel relative to said first overhead track member extension and said second overhead track member extension, said switching station further includes an alignment means comprising a first and second channel alignment aperture formed on said first and second rack channel extension respectively to selectively receive an alignment pin extending downwardly from said positioning means to alternately align said first and second overhead track member extensions relative to said first track channel.

2. The greenhouse transportation system of claim 1 wherein said switching station further includes a cart stop means comprising first and second stop members to selectively block said first and second overhead track member extention respectively.

3. A greenhouse transport system for moving plants and plant trays through a greenhouse comprising a cart including a carriage assembly having at least one carriage assembly section including a roller extending upwardly from the cart, an overhead track assembly including a first track channel to receive said roller to support said cart thereon, and at least one lift station including a lift member coupled to a lift frame by a lift means to selectively move said lift member between lower and upper positions having a lift channel formed thereon to receive said roller therein and an alignment means disposed to engage said lift member when in said upper position comprising a pair of alignment members extending downwardly from said lift frame and an alignment cam surface formed on the lower portion of each said alignment member to direct said lift channel member to an alignment slot formed therebetween such that when said lift member is in said lower position said roller is operatively disposed in said lift channel and said lift channel is axially aligned relative to said first track channel by said alignment means as said lift member is moved from said lower position to said upper position to permit said cart to be moved from said lift channel to said first track channel whereby said roller is disposed within said first track channel for movement through the greenhouse on said overhead track assembly.

4. The greenhouse transportation system of claim 3 further including a stop means comprising a stop member extending between said pair of alignment elements to limit the vertical movement of said lift channel member within said alignment slot.

5. The greenhouse transportation system of claim 3 wherein said lift means further includes a cross-lift mechanism member affixed to said lift channel and has a lift mechanism roller assembly mounted on opposite ends of said cross-lift mechanism member, said lift mechanism roller assembly being coupled to said lift frame to maintain vertical alignment thereof.

6. A greenhouse transport system for moving plants and plant trays through a greenhouse comprising a cart including a carriage assembly having at least one carriage assembly section including a roller extending upwardly from said cart, an overhead track assembly including a first track channel to receive said roller to support said cart thereon, and at least one lift station including a lift member movable between lower and upper positions having a lift channel formed thereon to receive said roller therein and an alignment assembly disposed to engage said lift members when in said upper position and said overhead track assembly further includes a guided means comprising an inclined flange extending downward from opposite sides of said overhead track assembly such that when said lift member is in said lower position said roller is operatively disposed in said lift channel and said lift channel is axially aligned relative to said first track channel by said alignment assembly and said guide means as said lift member is moved from said lower position to said upper position to permit said cart to be moved from said lift channel to said first track channel whereby said roller is disposed within said first track channel for movement through the greenhouse on said overhead track assembly.

* * * * *